(12) United States Patent
Xu et al.

(10) Patent No.: US 11,693,764 B2
(45) Date of Patent: Jul. 4, 2023

(54) METHOD, APPARATUS, DEVICE AND STORAGE MEDIUM FOR MAP RETRIEVAL TEST

(71) Applicant: BEIJING BAIDU NETCOM SCIENCE AND TECHNOLOGY CO., LTD., Beijing (CN)

(72) Inventors: Ling Xu, Beijing (CN); Taiping Guo, Beijing (CN); Jianli Sun, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 159 days.

(21) Appl. No.: 17/206,533

(22) Filed: Mar. 19, 2021

(65) Prior Publication Data
US 2021/0209013 A1 Jul. 8, 2021

(30) Foreign Application Priority Data
Sep. 29, 2020 (CN) .......................... 202011053278.7

(51) Int. Cl.
*G06F 11/00* (2006.01)
*G06F 11/36* (2006.01)
(Continued)

(52) U.S. Cl.
CPC ...... *G06F 11/3688* (2013.01); *G06F 11/3684* (2013.01); *G06F 16/29* (2019.01); *G06F 16/9566* (2019.01)

(58) Field of Classification Search
CPC .. G06F 11/3684; G06F 11/3688; G06F 16/29; G06F 16/9566
See application file for complete search history.

(56) References Cited

U.S. PATENT DOCUMENTS

2007/0028217 A1* 2/2007 Mishra ................ G06F 11/3688
717/124
2012/0271848 A1* 10/2012 Kadowaki .......... G01C 21/3878
707/769
(Continued)

FOREIGN PATENT DOCUMENTS

CN 202836584 U 3/2013
CN 111309843 A 6/2020
(Continued)

OTHER PUBLICATIONS

Office Action of Japanese Patent Application 2021-070345, dated Feb. 24, 2022 (7 pages).
(Continued)

*Primary Examiner* — Joshua P Lottich
(74) *Attorney, Agent, or Firm* — Quarles & Brady LLP; James J. Aquilina

(57) ABSTRACT

The present application discloses a method, an apparatus, a device and a storage medium for map retrieval test, relating to the fields of intelligent transportation, data retrieval and the like. The specific implementation scheme includes: analyzing historical interaction data of a user and an electronic map, to obtain an analysis result; the analysis result is used for representing the historical interaction data from a plurality of dimensions; associating the historical interaction data with the analysis result used for representing the historical interaction data from the plurality of dimensions, to obtain associated data; generating test data based on the historical interaction data in the associated data and the analysis result representing the historical interaction data from at least one dimension; and testing the electronic map by utilizing the test data, to obtain a test result of the electronic map.

15 Claims, 6 Drawing Sheets

(51) Int. Cl.
   *G06F 16/955*    (2019.01)
   *G06F 16/29*     (2019.01)

(56) References Cited

U.S. PATENT DOCUMENTS

| | | | |
|---|---|---|---|
| 2015/0046909 A1 | 2/2015 | Ligman et al. | |
| 2017/0091326 A1 | 3/2017 | Chernyal et al. | |
| 2018/0004807 A1* | 1/2018 | Cohen | G06F 16/9535 |
| 2018/0143998 A1* | 5/2018 | Prahladka | G06F 16/29 |
| 2018/0307753 A1* | 10/2018 | Guo | G06F 16/64 |
| 2021/0209842 A1* | 7/2021 | Cieplinski | G06F 16/29 |
| 2021/0357083 A1* | 11/2021 | Aspinall | G06F 16/54 |
| 2021/0398152 A1* | 12/2021 | Castinado | G06Q 50/28 |

FOREIGN PATENT DOCUMENTS

| | | | |
|---|---|---|---|
| JP | 2013105358 A | 5/2013 | |
| JP | 2014142745 A | 8/2014 | |
| JP | 2019061503 A | 4/2019 | |
| KR | 20190029705 A | 3/2019 | |

OTHER PUBLICATIONS

Extended European Search Report of European Patent Application No. 21164004.0 dated Aug. 21, 2021 (7 pages).
Korean Patent Office, Request for the Submission of an Opinion: Notice of Reasons for Refusal, Application No. 10-2021-0038011, dated Jul. 5, 2022, 13 pages.
Summons to attend oral proceedings pursuant to Rule 115(1) EPC issued in EP Application No. 21 164 004.0, dated Sep. 21, 2022 (8 pages).

* cited by examiner

METHOD, APPARATUS, DEVICE AND STORAGE MEDIUM FOR MAP RETRIEVAL TEST

CROSS-REFERENCE TO RELATED APPLICATION

This application claims priority to Chinese patent application No. 202011053278.7, filed on Sep. 29, 2020, which is hereby incorporated by reference in its entirety.

TECHNICAL FIELD

The present application relates to the field of data processing, in particular to the fields of intelligent transportation, data retrieval and the like.

BACKGROUND

The test of electronic map is mainly applied to the upgrade scene of electronic map. Electronic maps of different versions before and after upgrading are tested by utilizing test data, to obtain a test result. In the related art, the test data of an electronic map depends on an inherent word table.

SUMMARY

The present application provides a method, an apparatus, a device and a storage medium for map retrieval test.

According to one aspect of the present application, the present application provides a method for map retrieval test, which may include the following steps of:

analyzing historical interaction data of a user and an electronic map, to obtain an analysis result; the analysis result is used for representing the historical interaction data from a plurality of dimensions;

associating the historical interaction data with the analysis result used for representing the historical interaction data from the plurality of dimensions, to obtain associated data;

generating test data based on the historical interaction data in the associated data and the analysis result representing the historical interaction data from at least one dimension; and testing retrieval of the electronic map by utilizing the test data, to obtain a test result.

According to another aspect of the present application, the present application provides an apparatus for map retrieval test, which may include the following components:

an interaction data analyzing module configured for analyzing historical interaction data of a user and an electronic map, to obtain an analysis result; the analysis result is used for representing the historical interaction data from a plurality of dimensions;

a data associating module configured for associating the historical interaction data with the analysis result used for representing the historical interaction data from the plurality of dimensions, to obtain associated data;

a test data generating module configured for generating test data based on the historical interaction data in the associated data and the analysis result representing the historical interaction data from at least one dimension; and a map retrieval testing module configured for testing retrieval of the electronic map by utilizing the test data, to obtain a test result.

In a third aspect, an embodiment of the present application provides an electronic device, including:

at least one processor; and a memory communicatively connected to the at least one processor, wherein the memory stores instructions executable by the at least one processor, the instructions being executed by the at least one processor to enable the at least one processor to execute the method provided by any one of the embodiments of the present application.

In a fourth aspect, an embodiment of the present application provides a non-transitory computer-readable storage medium storing computer instructions, the computer instructions causing a computer to perform a method provided by any one of the embodiments of the present application.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The drawings are provided for better understanding of the present application, rather than limiting the present application. In which.

DETAILED DESCRIPTION

Exemplary embodiments of the present application are described below in combination with the accompanying drawings, including various details of the embodiments of the present application to facilitate the understanding, and they should be considered as merely exemplary. Thus, it should be realized by those of ordinary skill in the art that various changes and modifications can be made to the embodiments described here without departing from the scope and spirit of the present application. Also, for the sake of clarity and conciseness, the contents of well-known functions and structures are omitted in the following description.

The test of electronic map is mainly applied to the upgrade scene of electronic map. Electronic maps of different versions before and after upgrading are tested by utilizing test data, to obtain a test result. In the related art, the test data of an electronic map depends on an inherent word table. However, the above-mentioned test data cannot cover test scene, resulting in a lack of test integrity.

Figure 1:
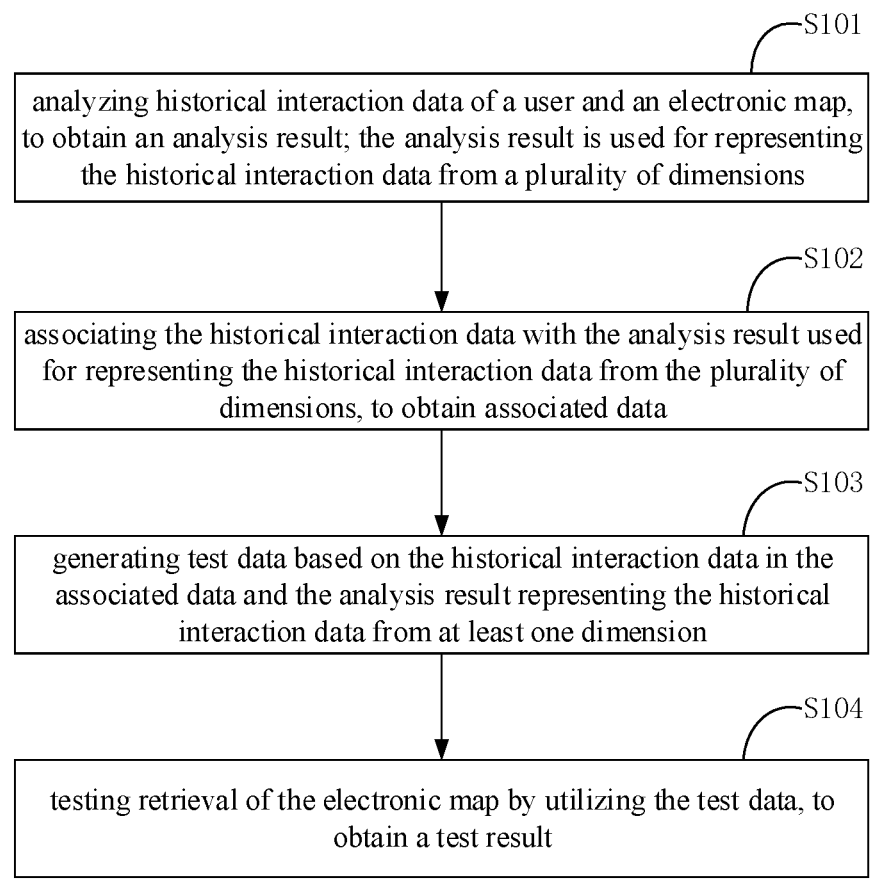
FIG. 1 is a flowchart of a method for map retrieval test in accordance with the present application.

As shown in FIG. 1, in one embodiment, the present application provides a method for map retrieval test, which may include the following steps of:

S101: analyzing historical interaction data of a user and an electronic map, to obtain an analysis result; the analysis result is used for representing the historical interaction data from a plurality of dimensions;

S102: associating the historical interaction data with the analysis result used for representing the historical interaction data from the plurality of dimensions, to obtain associated data;

S103: generating test data based on the historical interaction data in the associated data and the analysis result representing the historical interaction data from at least one dimension; and S104: testing retrieval of the electronic map by utilizing the test data, to obtain a test result.

In general, the upgrade of electronic map retrieval can be based on the logics of different dimensions, such as upgrade from a display level of search results, upgrade from a search content level in response to a user input, and so on. The present application aims to enrich historical interaction data and obtain multi-dimensional representation thereof. The retrieval of a map is tested by utilizing the historical interaction data and the multi-dimensional representation thereof, so that the upgrading logic of the electronic map can be hit, achieving the optimal testing effect.

In an embodiment of the present application, the historical interaction data between the user and the electronic map may be data for the past six months or one year. The historical interaction data may include data after analyzing search records of the user and search results presented by the electronic map based on the search records of the user. Unanalyzed data may be analyzed according to the method of the present application, to finally generate test data.

For example, the search record may include an accuracy requirement for the user to perform a point-of-interest search. The requirement may include direct input of a specific point of interest (XX Building), user input of a pan point of interest "Park", user input of a brand point of interest "XX (Brand) Chain Store", etc.

As another example, the search record may include a manner in which a user inputs a point of interest. The manner may include inputting the name of a point of interest in a single search box, inputting the names of a starting point and a point of interest in two search boxes respectively, inputting the name of a point of interest by utilizing an association function or a default point-of-interest pushing function, selecting a point of interest from an electronic map, and the like.

As another example, the search record may include the attribute of a point of interest that the user ultimately confirms. The attribute may include the type of the point of interest, such as delicious food, sight, hotel or gas station, etc. Alternatively, the attribute may also include the geographic position of the point of interest, which may range from administrative divisions, cities, business clusters, streets, etc.

The search results presented by the electronic map based on the user's search records may include the display mode of search results. For example, there may be a unique display on a list page of search results, a multiple display on a list page of search results, a display in the form of an image area, etc.

In a case where the data are acquired, the data can be analyzed to obtain an analysis result. The analysis result may represent historical interaction data from a plurality of dimensions. For example, the a plurality of dimensions may include the dimension of a user's operation, the dimension of a user's search requirement, the dimension in which search results are displayed on an electronic map, etc.

In a case where the analysis result is determined, test data can be generated according to the historical interaction data and the analysis result. For the analysis result, any one or more dimensions representing the historical data may be selected therefrom. The particular selection may be determined according to the electronic map to be tested.

The test data can be code applied to map testing, and the test data can be generated by compiling the historical interaction data and the analysis result. For compiling the historical interaction data, different fields can be extracted from the historical interaction data, such as a field corresponding to a user identity (ID), a field corresponding to a point of interest and the like.

The test data are inputted into the electronic map of different versions, to obtain a test result of the electronic map. The test results may be shown in comparative form. For example, the display content may include the test data, as well as returned results of the electronic map of different versions. The returned results of the electronic map of the different versions may include a plurality of types of information about a point of interest, such as the name, geographic position, type, display manner of the point of interest in the electronic map, etc. Therefore, a tester can conveniently and intuitively compare and understand differences between the electronic map of different versions.

In general, the upgrade of an electronic map can be based on different logics, such as upgrade from a display level of search results, upgrade from a search content level in response to user input, and so on. By analyzing the historical interaction data, the historical interaction data can be enriched. Compared with the related art, only the fixed word list is used for testing, and after the historical interaction data are analyzed, the retrieval result of the point of interest for electronic map retrieval can be tested by utilizing more dimensional information. The upgrade logic of the electronic map can thus be hit.

In one embodiment, the association mode of the historical interaction data and the analysis result in S102 may specifically include:

acquiring feature information in the historical interaction data, and associating the historical interaction data with the analysis result by utilizing the feature information, to obtain the associated data.

The feature information in the historical interaction data may be ID information of a user. For example, the ID information of the user may be generated based on registration information of the user, the ID of a device accessing the map, etc. Every time the user interacts with the map, the ID information of the user can be loaded. The ID information of the user can be loaded into the historical interaction data and the analysis result respectively, so that the historical interaction data and the analysis result with the same ID information are associated.

Alternatively, the feature information in the historical interaction data may also be a point of interest searched by a user, for example, the point of interest may be XX building. In this case, the historical interaction data may be associated with the analysis result according to the same point of interest.

Through the above scheme, the association between the historical interaction data and the analysis result can be established in a huge database according to the feature information, and in a case where test data is generated, the analysis result associated with the historical interaction data can be quickly inquired, so that the test data is generated.

Figure 2:
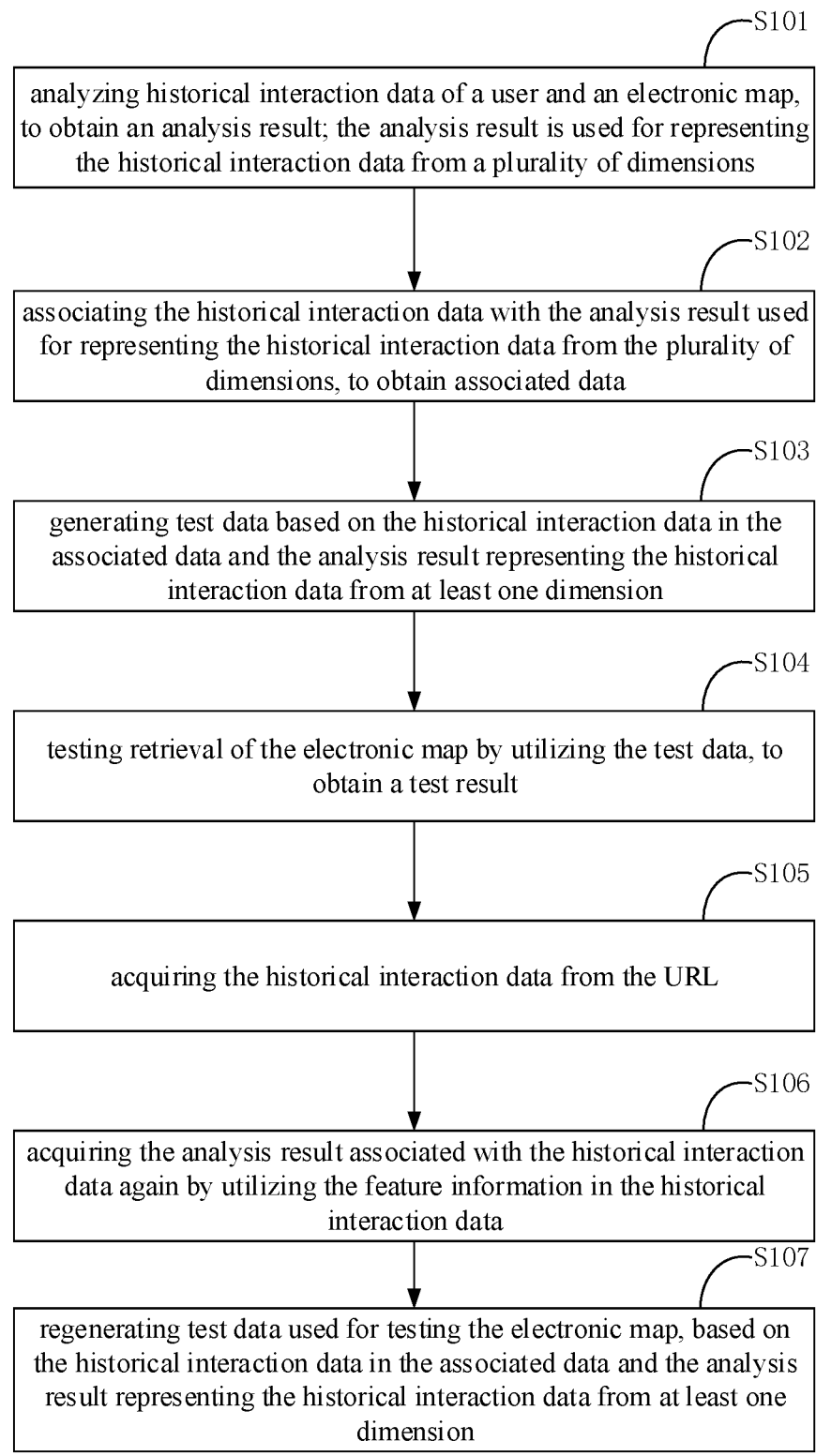
FIG. 2 is a flowchart of a method for map retrieval test in accordance with the present application.

As shown in FIG. 2, in one embodiment, the historical interaction data may be recorded in a uniform resource locator (URL); in this case, the method of the present application may further include the following steps of:

S105: acquiring the historical interaction data from the URL;

S106: acquiring the analysis result associated with the historical interaction data again by utilizing the feature information in the historical interaction data; and S107: regenerating test data used for testing the electronic map, based on the historical interaction data in the associated data and the analysis result representing the historical interaction data from at least one dimension.

The analyzed historical interaction data is recorded in the URL. Thus, the historical interaction data can be reproduced by utilizing the URL. Therefore, the same historical data can be used for testing, so that the test result is more intuitive.

In a case where test data are generated, historical interaction data can be acquired according to the URL. In a case where the historical interaction data are acquired, the analysis result associated with the historical interaction data can be acquired again directly according to the feature information in the historical interaction data. Thus, the process of obtaining the analysis result by analyzing can be omitted.

Test data can be generated based on compiling of the acquired historical interaction data and the analysis result. In this process, for the analysis result, any one or more dimensions representing the historical data may be selected therefrom. The particular selection may be determined according to an electronic map to be tested.

It should be noted that in one embodiment, the test data may be generated by compiling the historical interaction data and the analysis result. In a case where the test data are obtained, the historical interaction data can be recorded in the URL, and the historical interaction data, the analysis result and the test data are associated according to the feature information in the historical interaction data. In a case where map testing is performed, a desired analysis result can be selected. The historical interaction data associated with the analysis result is inquired according to the association condition. Furthermore, test data for testing the electronic map are directly obtained through the association condition.

Through the above scheme, the historical interaction data and the analysis result can be acquired based on the feature information in the URL and the historical interaction data, so that the test data can be obtained through compiling. Moreover, because the historical interaction data is reproducible, a plurality of tests can be performed on the same data, so that the test results are enriched.

Figure 3:
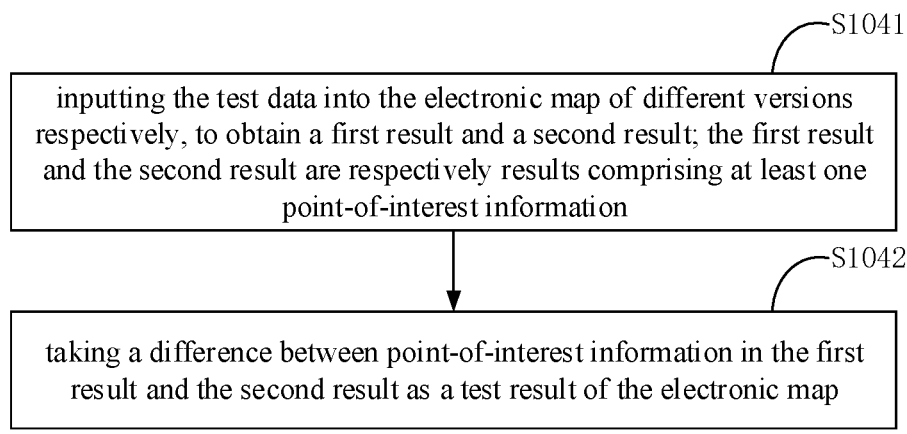
FIG. 3 is a flowchart for obtaining a test result of an electronic map in accordance with the present application.

As shown in FIG. 3, in one embodiment, S104 may further include the following steps of:

S1041: inputting the test data into the electronic map of different versions respectively, to obtain a first result and a second result; the first result and the second result are respectively results comprising at least one point-of-interest information; and S1042: taking a difference between point-of-interest information in the first result and the second result as a test result of the electronic map.

For example, electronic maps of two versions including a first version and a second version may be included. The electronic map of the first version may be an electronic map before upgrading, and the electronic map of the second version may be an electronic map after upgrading.

The test data is inputted to the electronic map of different versions respectively, so that a first result is obtained from the electronic map of the first version, and a second result is obtained from the electronic map of the second version.

Herein, both the first result and the second result may include at least one point-of-interest information. The point-of-interest information may include a name of a point of interest, a geographic position of the point of interest, an administrative region to which the point of interest belongs, a display form of an electronic map for the point of interest, and the like.

Compared with the related art, in a case where a test result is obtained, only the number of identical contents and the number of different contents of the test result may be displayed. The present application can more intuitively display the difference of electronic maps of different versions by means of displaying the point-of-interest information, thereby facilitating detection personnel to quickly, accurately and intuitively acquire the test result.

In one embodiment, the dimension may include:

at least one of accuracy requirement of the user for the search result, a manner in which the user determines the search result, a geographic position and an industry category of the search result, and a search result presented by an electronic map.

Figure 4:
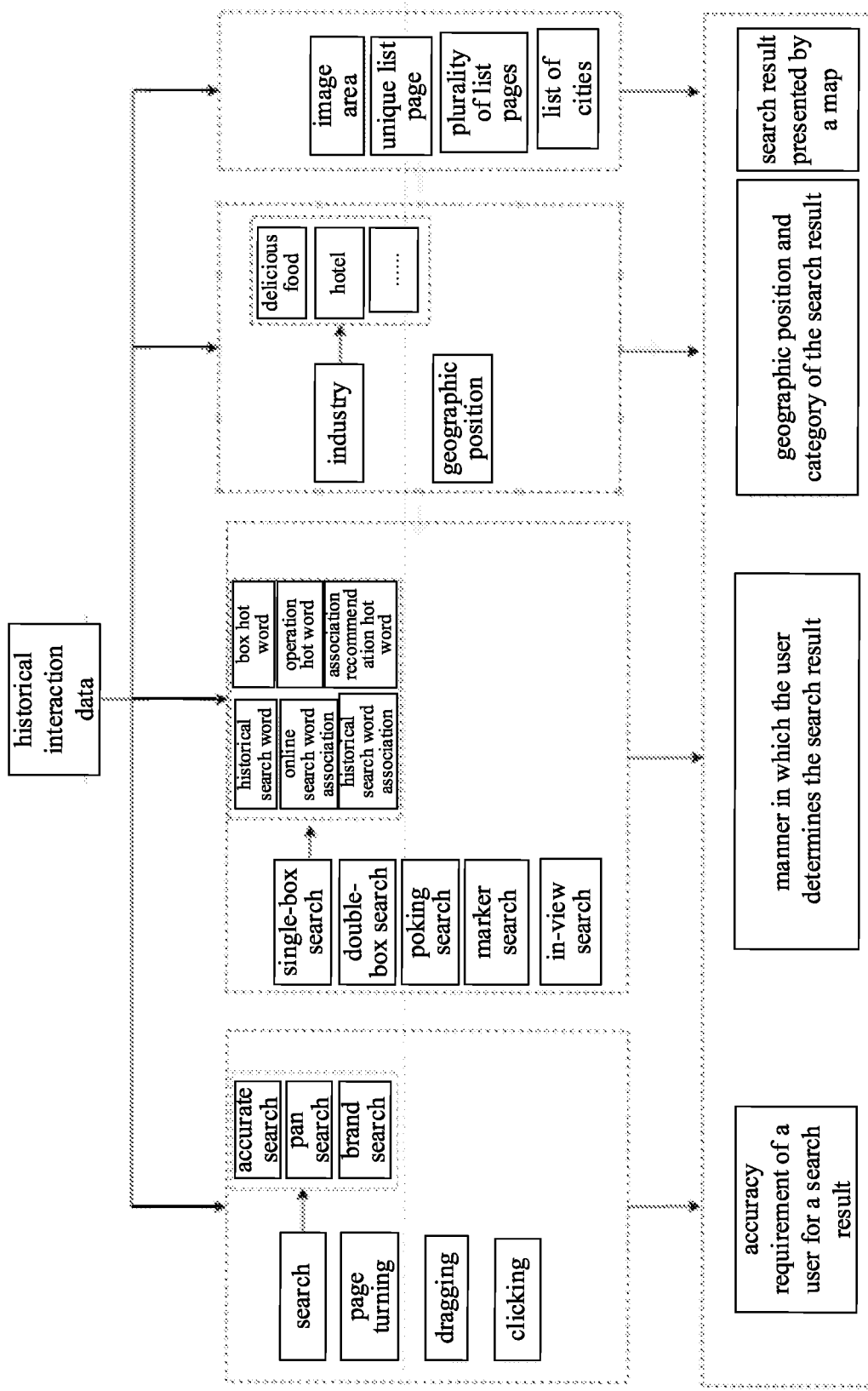
FIG. 4 is a schematic diagram of analyzing historical interaction data in accordance with the present application.

As shown in FIG. 4, historical interaction data may be represented from different dimensions by analyzing fields. It is exemplified by examples one by one.

Accuracy requirement of the user for the search result.

An operations performed on the screens of a smart phone and a vehicle-mounted navigation device may be regarded as an action on a user side. The action may include searching, page turning, dragging, clicking, etc. The search operation may be further subdivided into categories such as accurate search, pan search and brand search. Through the action on the user side, the accuracy requirement of the user for the search result can be determined.

The manner in which the user determines the search result.

The manner in which the user inputs the point of interest may include a single-box search, a multi-box search, a poking search, a marker search, an in-view search, etc.

A single-box search means searching for a point of interest in one input box. The single-box search may further include:

historical word searching, i.e., a search that follows historical search records;

historical search word association, for a point of interest that is not entered by the user for the first time, a search for supplementary associated words is performed through historical records;

box hot word, a search for a place recommended to a user based on the search popularity of other users in a case where the user does not enter a point of interest;

operation hot word, a search for a place recommended to a user based on operational needs in a case where the user does not enter a point of interest.

The multi-box search may include a search that a user inputs a starting point and a point of interest, as well as positions along the way.

The poking search may include a search that a user selects a point-of-interest in a map by means of point-touch.

The marker search may include a search that a user performs a selection among a plurality of selectable objects.

The in-view search may include a search that a user selects a point of interest within the scope of a map display.

In addition, determining a pre-operation of a user before the final determination of the point of interest may also be included. For example, the pre-operation may include actions of dragging a map, and changing a single box search to a multi-box search by a user.

Additionally, determining a source of a point of interest may also be included, e.g., the source may be actively input by a user, or selected according to a recommendation, etc.

Geographic position and industry category of search results.

A point of interest determined by a user can be analyzed to obtain the geographic position and the industry category of the point of interest. Among other things, the industry category may include delicious food category, hotel category, etc.

Search results presented in the map.

After a user determines a point of interest, an electronic map displays the search result. The display mode may include displaying in the form of an image area (thumbnails, pictographic icons). The number of displays may include displaying in the form of a unique object on a list page, or displaying in the form of a plurality of objects on a list page. The display area may include displaying in a city list corresponding to point of interests.

Through the above scheme, the historical interaction data can be analyzed, thereby obtaining a result of representing the historical interaction data from a plurality of dimensions.

Figure 5:
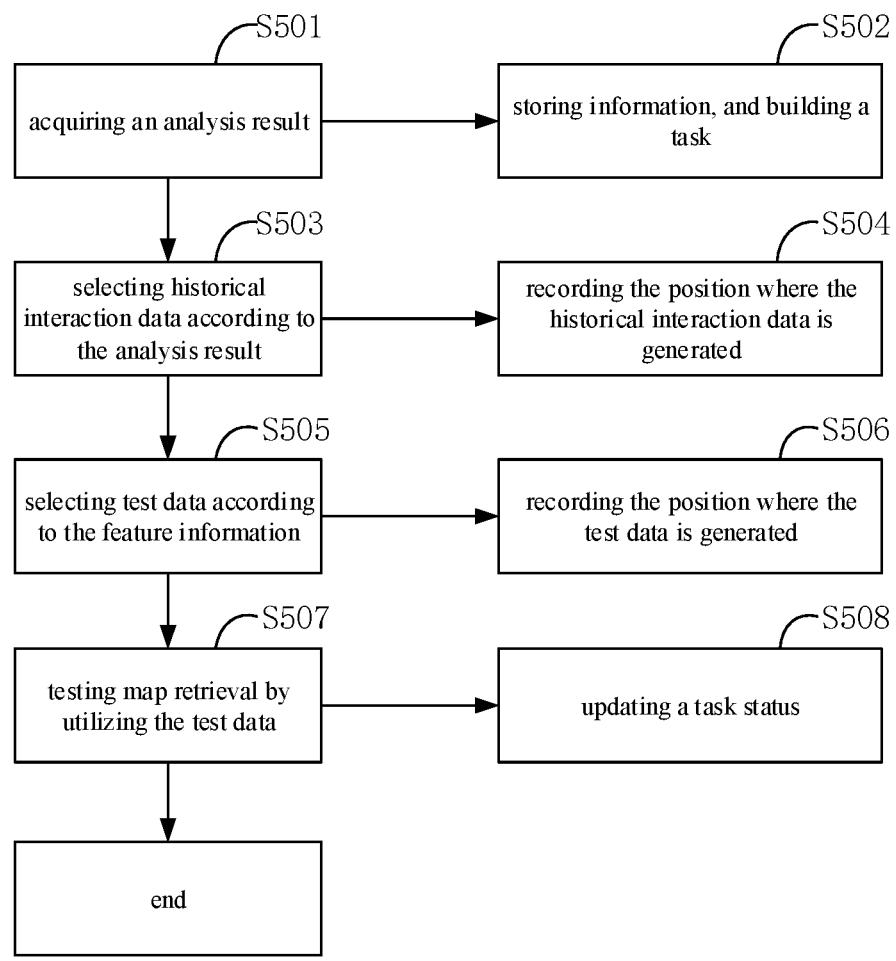
FIG. 5 is a flowchart of a method for map retrieval test in accordance with the present application.

As shown in FIG. 5, the present application provides a method for map retrieval test, which may include the following steps of:

S501: acquiring an analysis result.

Herein, the analysis result is the same as the previous embodiment, and is obtained by analyzing historical interaction data of a user and an electronic map. This is not repeated here. The above process may be performed in an off-line state.

S502: storing information, and building a task.

The information may be trigger information for building a task. The task may be a task of generating test data.

S503: selecting historical interaction data according to the analysis result.

According to feature information corresponding to the analysis result, historical interaction data associated with the analysis result can be selected by utilizing a URL.

S504: recording the position where the historical interaction data is generated.

After the historical interaction data is selected, the position of the historical interaction data involved in the current test task can be recorded.

S505: selecting test data according to the feature information.

By utilizing the feature information in the historical interaction data, the test data associated with the historical interaction data can be selected.

S506: recording the position where the test data is generated.

After the test data is selected, the position of the test data may be recorded.

S507: testing map retrieval by utilizing the test data.

This step, as well as S503, S505, may be performed online.

S508: updating a task status.

Figure 6:
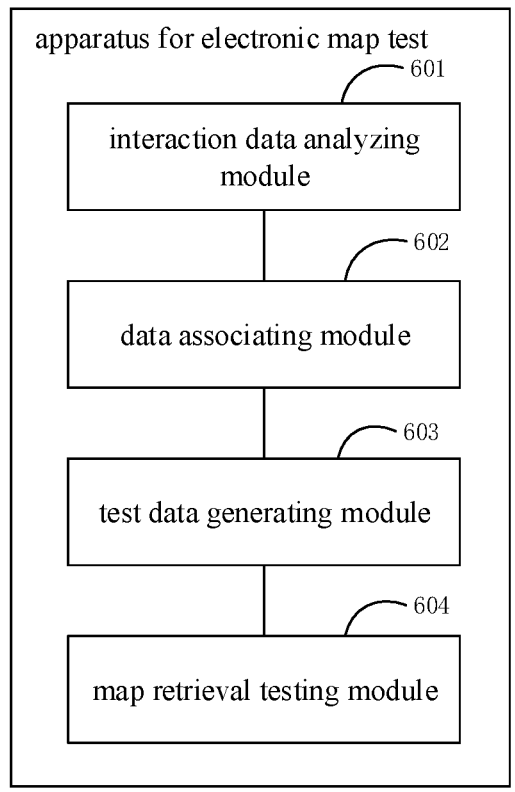
FIG. 6 is a schematic diagram of an apparatus for map retrieval test according to the present application.

As shown in FIG. 6, the present application provides an apparatus for map retrieval test, which may include the following components:

an interaction data analyzing module 601 configured for analyzing historical interaction data of a user and an electronic map, to obtain an analysis result; the analysis result is used for representing the historical interaction data from a plurality of dimensions;

a data associating module 602 configured for associating the historical interaction data with the analysis result used for representing the historical interaction data from the plurality of dimensions, to obtain associated data;

a test data generating module 603 configured for generating test data based on the historical interaction data in the associated data and the analysis result representing the historical interaction data from at least one dimension; and a map retrieval testing module 604 configured for testing retrieval of the electronic map by utilizing the test data, to obtain a test result.

In one embodiment, the data associating module 602 may include:

a feature information acquiring submodule configured for acquiring feature information in the historical interaction data; and a data association executing submodule configured for associating the historical interaction data with the analysis result by utilizing the feature information, to obtain the associated data.

In one embodiment, the historical interaction data may be recorded in a URL;

based on this, the apparatus for map retrieval test may further include:

a historical interaction data acquiring module configured for acquiring the historical interaction data from the URL;

an analysis result acquiring module configured for acquiring the analysis result associated with the historical interaction data again by utilizing the feature information in the historical interaction data; and a test data generating module configured for regenerating test data used for testing the electronic map, based on the historical interaction data in the associated data and the analysis result representing the historical interaction data from at least one dimension.

In one embodiment, the map retrieval testing module 604 may further include:

a result acquiring submodule configured for inputting the test data into the electronic map of different versions respectively, to obtain a first result and a second result; the first result and the second result are respectively results comprising at least one point-of-interest information; and a test result generating submodule configured for taking a difference between point-of-interest information in the first result and the second result as a test result of the electronic map.

In one embodiment, the dimension may include:

at least one of accuracy requirement of the user for the search result, a manner in which the user determines the search result, a geographic position and an industry category of the search result, and a search result presented by an electronic map.

According to an embodiment of the present application, the present application further provides an electronic device and a readable storage medium.

Figure 7:
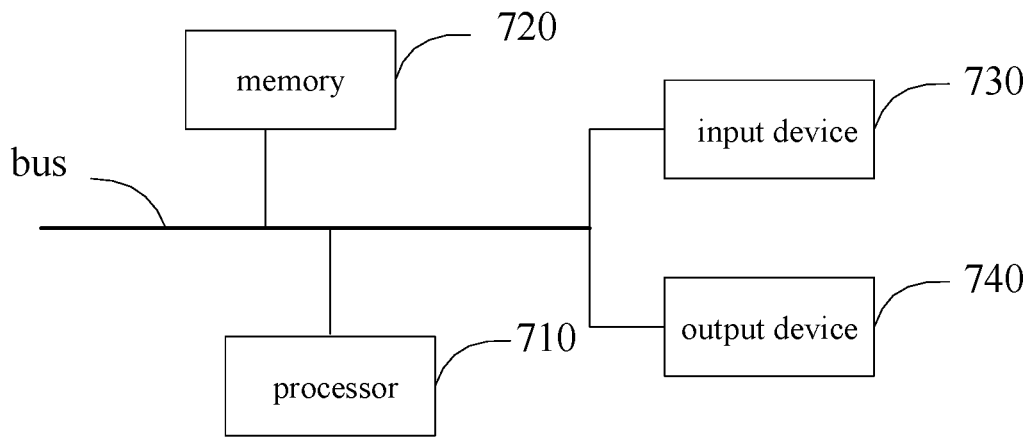
FIG. 7 is a block diagram of an electronic device for implementing the method for map retrieval test of an embodiment of the present application.

FIG. 7 is a block diagram of an electronic device for implementing a method for map retrieval test according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 7, the electronic device may include one or more processors 710, a memory 720, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 710 is shown in FIG. 7.

The memory 720 is a non-transitory computer-readable storage medium provided by the present application. The memory stores instructions executable by at least one processor to cause the at least one processor to execute the method for map retrieval test provided by the present application. The non-transitory computer-readable storage medium of the present application stores computer instructions for enabling a computer to execute the method for map retrieval test provided by the present application.

The memory 720, as a non-transitory computer-readable storage medium, may be configured to store non-transitory software programs, non-transitory computer executable programs and modules, such as program instructions/modules corresponding to the method for map retrieval test in the embodiments of the present application (e.g., the interaction data analyzing module 601, the data associating module 602, the test data generating module 603, and the map retrieval testing module 604 shown in FIG. 6). The processor 710 executes various functional applications and data processing of the server by running the non-transitory software programs, instructions and modules stored in the memory 720, that is, implements the map retrieval test in the above method embodiments.

The memory 720 may include a program storage area and a data storage area, wherein the program storage area may store an operating system, and an application program required for at least one function; and the data storage area may store data created according to the use of the electronic device for implementing the method for map retrieval test, etc. In addition, the memory 720 may include a high speed random access memory, and may also include a non-transitory memory, such as at least one disk storage device, a flash memory device, or other non-transitory solid state storage devices. In some embodiments, the memory 720 may optionally include memories remotely located with respect to the processor 710, and these remote memories may be connected, via a network, to the electronic device for implementing the method for map retrieval test. Examples of such networks may include, but are not limited to, the Internet, an intranet, a local area network, a mobile communication network and combinations thereof.

The electronic device for implementing the method for map retrieval test may further include an input device 730 and an output device 740. The processor 710, the memory 720, the input device 730, and the output device 740 may be connected by a bus or in other ways, and the bus connection is taken as an example in FIG. 7.

The input device 730 may receive input digitals or character information, and generate a key signal input related to a user setting and a function control of an electronic device for implementing the method for map retrieval test. For example, the input device may be a touch screen, a keypad, a mouse, a track pad, a touch pad, a pointer stick, one or more mouse buttons, a track ball, a joystick, and other input devices. The output device 740 may include a display apparatus, an auxiliary lighting device (e.g., a light emitting diode (LED)), a tactile feedback device (e.g., a vibrating motor), etc. The display apparatus may include, but is not limited to, a liquid crystal display (LCD), an LED display, and a plasma display. In some embodiments, the display apparatus may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS). The server may also be a server of a distributed system, or a server incorporating blockchain.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. A method for map retrieval test, comprising:
    analyzing historical interaction data of a user and an electronic map, to obtain an analysis result; the analysis result is used for representing the historical interaction data from a plurality of dimensions;
    associating the historical interaction data with the analysis result used for representing the historical interaction data from the plurality of dimensions, to obtain associated data;
    generating test data based on the historical interaction data in the associated data and the analysis result representing the historical interaction data from at least one dimension; and
    testing retrieval of the electronic map by utilizing the test data, to obtain a test result,
    wherein testing the electronic map by utilizing the test data, to obtain the test result of the electronic map, comprises:
    inputting the test data into the electronic map of different versions respectively, to obtain a first result and a second result; the first result and the second result are respectively results comprising at least one point-of-interest information; and
    taking a difference between point-of-interest information in the first result and the second result as a test result of the electronic map.

2. The method of claim 1, wherein obtaining the associated data, comprises:
    acquiring feature information in the historical interaction data; and
    associating the historical interaction data with the analysis result by utilizing the feature information, to obtain the associated data.

3. The method of claim 2, wherein the historical interaction data is recorded in a uniform resource locator (URL); the method further comprises:
    acquiring the historical interaction data from the URL;
    acquiring the analysis result associated with the historical interaction data again by utilizing the feature information in the historical interaction data; and
    regenerating test data used for testing the electronic map, based on the historical interaction data in the associated data and the analysis result representing the historical interaction data from at least one dimension.

4. The method of claim 1, wherein the dimension comprises: at least one of accuracy requirement of the user for the search result, a manner in which the user determines the search result, a geographic position and an industry category of the search result, and a search result presented by an electronic map.

5. The method of claim 2, wherein the dimension comprises: at least one of accuracy requirement of the user for the search result, a manner in which the user determines the search result, a geographic position and an industry category of the search result, and a search result presented by an electronic map.

6. The method of claim 3, wherein the dimension comprises: at least one of accuracy requirement of the user for the search result, a manner in which the user determines the search result, a geographic position and an industry category of the search result, and a search result presented by an electronic map.

7. An apparatus for map retrieval test, comprising:
    a processor and a memory for storing one or more computer programs executable by the processor,
    wherein when executing at least one of the computer programs, the processor is configured to perform operations comprising:
    analyzing historical interaction data of a user and an electronic map, to obtain an analysis result; the analysis result is used for representing the historical interaction data from a plurality of dimensions;
    associating the historical interaction data with the analysis result used for representing the historical interaction data from the plurality of dimensions, to obtain associated data;
    generating test data based on the historical interaction data in the associated data and the analysis result representing the historical interaction data from at least one dimension; and
    testing retrieval of the electronic map by utilizing the test data, to obtain a test result,
    wherein, when executing at least one of the computer programs, the processor is configured to further perform operations comprising:
    inputting the test data into the electronic map of different versions respectively, to obtain a first result and a second result the first result and the second result are respectively results comprising at least one point-of-interest information; and
    taking a difference between point-of-interest information in the first result and the second result as a test result of the electronic map.

8. The apparatus of claim 7, wherein, when executing at least one of the computer programs, the processor is configured to further perform operations comprising:
    acquiring feature information in the historical interaction data; and associating the historical interaction data with the analysis result by utilizing the feature information, to obtain the associated data.

9. The apparatus of claim 8, wherein the historical interaction data is recorded in a uniform resource locator (URL);

when executing at least one of the computer programs, the processor is configured to further perform operations comprising:

acquiring the historical interaction data from the URL;

acquiring the analysis result associated with the historical interaction data again by utilizing the feature information in the historical interaction data; and regenerating test data used for testing the electronic map, based on the historical interaction data in the associated data and the analysis result representing the historical interaction data from at least one dimension.

10. The apparatus of claim 7, wherein the dimension comprises:

at least one of accuracy requirement of the user for the search result, a manner in which the user determines the search result, a geographic position and an industry category of the search result, and a search result presented by an electronic map.

11. The apparatus of claim 8, wherein the dimension comprises:

at least one of accuracy requirement of the user for the search result, a manner in which the user determines the search result, a geographic position and an industry category of the search result, and a search result presented by an electronic map.

12. The apparatus of claim 9, wherein the dimension comprises:

at least one of accuracy requirement of the user for the search result, a manner in which the user determines the search result, a geographic position and an industry category of the search result, and a search result presented by an electronic map.

13. A non-transitory computer-readable storage medium storing computer instructions, wherein the computer instructions cause a computer to perform the method of claim 1.

14. A non-transitory computer-readable storage medium storing computer instructions, wherein the computer instructions cause a computer to perform the method of claim 2.

15. A non-transitory computer-readable storage medium storing computer instructions, wherein the computer instructions cause a computer to perform the method of claim 3.

\* \* \* \* \*